United States Patent
Kust

[11] Patent Number: 5,917,110
[45] Date of Patent: Jun. 29, 1999

[54] MOISTURE-RESISTANT CALCIUM CONTAINING PARTICLES

[75] Inventor: Roger N. Kust, Spring, Tex.

[73] Assignee: Tetra Technologies, Inc., The Woodlands, Tex.

[21] Appl. No.: 08/732,706

[22] Filed: Oct. 18, 1996

[51] Int. Cl.[6] .............. C05C 9/00; C05C 11/00; C05D 9/00
[52] U.S. Cl. ............ 71/27; 71/28; 71/29; 71/30; 71/34; 71/58; 71/63; 71/64.07
[58] Field of Search .............. 71/63, 64.02, 64.03, 71/64.07, 64.11, 64.12, 64.13, 27, 28, 29, 30, 58, 34

[56] References Cited

U.S. PATENT DOCUMENTS

| | | | |
|---|---|---|---|
| 1,592,971 | 7/1926 | Dow . | |
| 2,074,880 | 3/1937 | Whittaker et al. | 260/125 |
| 3,070,435 | 12/1962 | Reusser et al. | 71/58 |
| 3,192,031 | 6/1965 | Zaayenga | 71/28 |
| 3,250,607 | 5/1966 | Sawyer et al. | 71/64.07 |
| 3,331,677 | 7/1967 | Campbell et al. | 71/28 |
| 3,740,248 | 6/1973 | Buhler et al. | 117/13 |
| 3,804,661 | 4/1974 | Muntzer et al. | 117/62.2 |
| 3,906,140 | 9/1975 | Capes | 428/403 |
| 4,012,537 | 3/1977 | Dubois | 427/138 |
| 4,213,924 | 7/1980 | Shirley, Jr. | 264/7 |
| 4,252,831 | 2/1981 | Gleckler et al. | 426/74 |
| 4,424,176 | 1/1984 | Shirley, Jr. et al. | 264/7 |
| 4,506,453 | 3/1985 | Shirley, Jr. et al. | 34/12 |
| 5,328,497 | 7/1994 | Hazlett | 71/64.07 |
| 5,360,465 | 11/1994 | Buchholz et al. | 71/11 |
| 5,383,952 | 1/1995 | Singewald et al. | 71/63 |
| 5,431,708 | 7/1995 | Lehmann et al. | 71/64.07 |

FOREIGN PATENT DOCUMENTS

| | | | |
|---|---|---|---|
| 1101904 | 4/1995 | China . | |
| 4029955 | 9/1990 | Germany | 71/64.07 |

OTHER PUBLICATIONS

Koenig, R.T. and Pan, W.L.; Chloride enhancement of wheat responses to ammonium nutrition. *Soil Sci. Soc. Am. J.* (1996), 60,(2) pp. 498–505.

Sloan, J.J. and Anderson, W.B.; Calcium chloride and ammonium thiosulfate as ammonia volatilization inhibitors for urea fertilizers. *Commun. Soil Sci. Plate Anal.* (1995) 26,(15 & 16) pp. 2425–2447.

Chemical Abstract No. 122(18)216719b, Powdered coated compositions with porcelain appearance (Oct. 20, 1993).

Chemical Abstract No. 119(16)162728w, Manufacture of crosslinked urea–formaldehyde polymer particles and coated paper thereof (Jun. 22, 1993).

Chemical Abstract No. 117(22)214699t, Induction–curing electrophoretically coatable epoxy sealants for metal seams (Apr. 22, 1992).

Chemical Abstract No. 113(22)193741a, Use of calcium sulfate and kaolin in a sizing mixture for coating of particle boards (1989).

Chemical Abstract No. 102(11)94816v, Coating urea (Nov. 13, 1984).

Agricola: 96:39689 Koenig et al, Chloride Enhancement of Wheat Responses to Ammonium Nutrition Mar. 1996.

Agricola 92:35873, Fenn et al, Nitrogen Changes in . . . Urea Mar. 1991.

*Primary Examiner*—Wayne Langel
*Attorney, Agent, or Firm*—Jo Katherine D'Ambrosio

[57] ABSTRACT

Free-flowing moisture resistant calcium-containing particles that inhibit the water absorption characteristics of calcium products, including soluble calcium products that are hygroscopic and deliquescent, by providing a moisture resistant coating. The core of the particle is a calcium-containing material, more particularly a soluble calcium-containing material. Moisture resistant or hydrophobic coatings are applied to the core to inhibit water absorption by the calcium-containing material. The coated particles may then be more easily shipped, stored and handled as a dry, anhydrous product. A core comprised of calcium chloride coated with urea is useful as both a soil conditioner and a fertilizer. Additional plant nutrients are mixed with either the core or the coating materials to improve fertilizing qualities. Additional coatings of hydrophobic materials such as a paraffinic hydrocarbon or a polymeric resin increase the water resistance of the particles. A final coating of a finely divided conditioning agents such as talc or calcium carbonate can be applied to achieve a more free-flowing particle.

30 Claims, No Drawings

MOISTURE-RESISTANT CALCIUM CONTAINING PARTICLES

FIELD OF THE INVENTION

The present invention relates to moisture resistant calcium-containing products, and more particularly to moisture resistant calcium-containing products which are coated with one or more materials to slow, delay, or inhibit the rate of moisture uptake by the calcium-containing core material.

BACKGROUND OF THE INVENTION

Calcium is an ubiquitous element that occurs commonly in nature both in soluble (calcium chloride, sea water) and insoluble (gypsum, limestone) forms. It is a macronutrient essential to all life forms. Certain soluble salts of calcium have large scale commercial significance in agriculture, road stabilization, as a soil amendment, as food additives, in the treatment of oily wastes, and as desiccants for drying gases and liquids.

Gypsum, a calcium sulfate, and limestone, a calcium carbonate, have been used to improve soil quality, but have relatively low solubility and therefore act slowly as soil conditioners. The soluble calcium salts, including calcium chloride which is the most prominent, present problems: liquid forms of these salts create bulk for shipping and storage purposes because of their high water content (65% to 70% $H_2O$). Anhydrous soluble calcium salts (90% to 95% $CaCl_2$), however, are hygroscopic and deliquescent, i.e. they absorb water to the point that the salts dissolve, creating even more long term shipping, storage and handling problems.

The use of calcium in soil conditioning and other industries has grown significantly over the past decade despite these problems. Solutions containing calcium ions are known to greatly improve hydraulic conductivity and water infiltration rates when applied to soils containing clays which have been swollen by sodium absorption. The addition of other nutrients such as nitrogen, phosphorus, potassium, magnesium, iron, zinc, copper, manganese, molybdenum, boron and sulfur, is a good fertilization technique to improve the yield of crops.

Commercial solutions of calcium chloride and urea, the urea added to provide nitrogen in the conditioning process, are also available. Disadvantages of these solution products include the high water content which increases transportation and storage costs per unit of calcium, and the requirement that liquid application devices be used. Moreover, dry granular conditioners are more compatible with the availability of equipment currently used in agriculture and land-use industries to spread other dry soil additives and/or fertilizers. Also, for shipping and storage purposes, anhydrous salts are obviously preferred because of ease of handling and cost effectiveness. If necessary, they may be returned to a soluble state by mixing in water on site.

As mentioned above, the hygroscopic and deliquescent properties associated with the anhydrous soluble calcium salts and some of their hydrates create storage, handling and usage problems. Frequently, moisture is absorbed by the stored salt and converts the initially free-flowing salt to a solid rock-like mass. This severely limits the shelf life, creates handling and disposal problems and generally leads to damaged goods expenses, and sometimes total loss of product.

What is needed is a dry, granular soluble calcium-containing product in which the moisture-absorbing characteristics associated with the highly-soluble calcium salts are significantly inhibited. Further, a calcium-containing material which contains a soluble calcium salt coated with a nitrogen containing material and/or other nutrient materials would both inhibit moisture uptake and meet the requirements of being compatible with widely available spreading equipment. This simultaneous application of soil conditioning calcium with other required macronutrients and/or micronutrients would have significant application to the agricultural industry. Unfortunately, admixtures of hygroscopic calcium salts with plant nutrients do not avoid the moisture uptake problem. For example, calcium chloride and urea form an adduct that is at least as or even more hygroscopic than calcium chloride itself.

Prior to the present invention, the treatments available to improve characteristics of fertilizer or calcium containing products include (1) fertilizers or other materials coated with a hydrophobic material, usually to prevent dusting or flaking; and (2) admixtures of calcium containing products with additives for improved qualities, often dust control.

Whittaker et al. disclose in U.S. Pat. No. 2,074,880 a molecular addition compound of calcium sulfate and urea for use as fertilizer. Muntzer et al. in U.S. Pat. No. 3,804,661 disclose a method for producing a solid material having hydrophobic and oleophilic characteristics comprising particles of chromium salt coated with paraffin used for cleaning up oil spills. U.S. Pat. No. 3,906,140 to Capes discloses co-pellets of calcium chloride and sodium chloride formed by using binder liquid salt solutions that form bridges between the initial particles upon drying. These references do not disclose the prevention of moisture absorption by coating core materials.

U.S. Pat. No. 1,592,971 to Dow discloses particles of caicium chloride in one state of hydration coated by particles of calcium chloride in a lower state of hydration. Buchholz et al. in U.S. Pat. No. 5,360,465 disclose particulate fertilizer dust control by treating inorganic fertilizers with a solution of urea and lignosulfate. The inorganic fertilizers include limestone and dolomite. It is noted that limestone is a form of calcium carbonate, and dolomite is a form of a calcium magnesium carbonate. Neither are hygroscopic or deliquescent. Gleckler et al. in U.S. Pat. No. 4,252,831 disclose feed grade calcium phosphates coated with molasses and surfactant used to minimize dusting. Buchholz and Glecker both attempted to reduce dusting.

Campbell et al. in U.S. Pat. No. 3,331,677 disclose a method of preparing particulate fertilizer that is coated with a urea-wax adduct. Each particle contains a core which is overlaid with a thin film which substantially covers the surface of the core. The core is a dispersion of urea in paraffin wax. Both Buchholz and Campbell maximized the use of urea in fertilizer by mixing it with additives. Campbell taught that coating fertilizer with a urea-wax adduct may prevent caking. Zaayenga in U.S. Pat. No. 3,192,031 discloses coated fertilizer compositions comprised of urea coated with a first coating of diatomaceous earth and a second coating of wax.

Buhler et al. in U.S. Pat. No. 3,740,248 disclose starch particles coated with wax to prevent offset of print from freshly printed sheets. Dubois in U.S. Pat. No. 4,012,537 discloses de-icing compositions contained in asphalt road surface material comprised of calcium or sodium chloride coated with linseed oil or other water-tight coating that may be worn away by mechanical action such as traffic movement.

None of these references, however, teach or suggest a core of a calcium-containing material which is hygroscopic or deliquescent combined with a less hygroscopic, soluble non-calcium coating material to inhibit the uptake of moisture by the core material.

SUMMARY OF THE INVENTION

The present invention resides, in part, in the discovery that particles of soluble calcium-containing materials can be coated with another material which is also soluble, but nonetheless inhibits moisture uptake by the calcium-containing material. This makes possible all sorts of applications where the coating material and the calcium-containing material are both useful in the desired application. As one example, particles comprising a calcium chloride core and a soluble nitrogen fertilizer coating such as urea, can be stored, shipped and applied as a free-flowing solid with better resistance to moisture than the calcium chloride without the coating.

Broadly, the free-flowing moisture-resistant calcium-containing particles of the present invention comprise a core of hygroscopic calcium-containing material and an essentially calcium free soluble coating on an outer surface of the core to inhibit moisture uptake by the core. The core can include an ammonia based material. Preferably, the moisture-resistant calcium-containing particles can include a hydrophobic coating over the soluble coating, or the soluble coating can include a hydrophobic material.

Preferably, the hydrophobic material is a paraffinic hydrocarbon. The paraffinic hydrocarbon is preferably petrolatum with a melting point between 100° F. and 260° F. The moisture resistant calcium-containing particles can also be mixed with a finely divided conditioning agent.

Preferably, the core of the moisture resistant calcium-containing particles comprises calcium chloride, calcium nitrate, calcium formate, calcium acetate, a calcium salt of an organic acid, a calcium saccharide compound, or a combination thereof. The particles can have an intermediate layer or precoating layer between the core and the soluble coating comprising a hydrophobic material layer. Alternatively, the intermediate or precoating layer can comprise an insoluble layer. The soluble coating is preferably a nitrogen-containing material. The insoluble layer can be comprised of sulfates, phosphates, carbonates, silicates or a combination thereof.

In another aspect of this invention, either the soluble coating or calcium-containing core includes one or more other plant nutrients. These plant nutrients can be selected from the group consisting of phosphorus, potassium, magnesium, iron, copper, zinc, manganese, molybdenum, sulfur, boron and combinations thereof. Preferably, the moisture-resistant calcium-containing particles have a particle size distribution substantially between 0.4 and 5 mm.

Another aspect of this invention is a composition useful as a soil amendment. This composition comprises granules having a calcium chloride core and a soluble nitrogen-containing coating wherein the coating inhibits moisture uptake by the core. The calcium chloride core preferably has a water content less than 50 weight percent. The nitrogen-containing coating is selected from the group consisting of urea, ammonium nitrate, urea phosphate, melamine, urea aldehyde polymers, monoammonium phosphate, diammoium phosphate or a combination thereof.

A further aspect of the invention is free-flowing, urea-coated calcium chloride particles comprising from 5 to 35 parts by weight urea, 100 parts by weight calcium chloride including any water of hydration; and a particle size distribution substantially between 0.4 and 5 mm. The free-flowing particles can also have an intermediate or precoating layer of an insoluble material selected from a group consisting of sulfates, phosphates, carbonates and silicates. In a preferred embodiment, the free-flowing particles have an outer coating of from 1 to 15 weight percent petrolatum. In another embodiment the free-flowing particles are in admixture with a finely-divided conditioning agent. A plant nutrient may be included in either the calcium chloride core or in the urea coating. The free-flowing particles can have a urea-calcium chloride adduct layer between the core and the coating. In a preferred embodiment, the coating of the free-flowing particles includes urea-formaldehyde resin. In one embodiment, the resin is dispersed in the urea coating, and in another, coated over the urea coating.

Another aspect of this invention is a method for making free-flowing calcium-containing soil amendment particles. This method comprises the steps of 1) spraying a molten soluble nitrogen-containing material onto hygroscopic calcium-containing granules sufficiently cool to solidify the molten material into a moisture-inhibiting coating on the particles, and 2) recovering the coated granules. Another step in this method can include applying a hydrophobic coating over the nitrogen-containing material. Alternatively, the nitrogen-containing material can include a hydrophobic material. The coated granules can be admixed with a finely divided conditioning agent.

In the above-described method, the calcium-containing granules can be selected from a group consisting of calcium chloride, calcium nitrate, calcium formate, calcium acetate, a calcium salt of an organic acid a calcium saccharide compound, or a combination thereof. Preferably, the nitrogen-containing material is selected from the group consisting of urea, ammonium nitrate, urea phosphate, melamine, urea aldehyde polymers, monoammonium phosphate, diammonium phosphate or a combination thereof. The hydrophobic coating can comprise a paraffinic hydrocarbon, preferably, petrolatum with a melting point between 100° F. and 260° F. The calcium-containing particles can have a water content less than 50 weight percent.

The calcium-containing particles preferably include one or more plant nutrients. The plant nutrients are selected from the group consisting of phosphorus, potassium, magnesium iron, copper, zinc, manganese, molybdenum, sulfur, boron and combinations thereof. In the preferred method, the spraying step is effected in a rotating pan or drum.

In another aspect of the method for making free-flowing calcium chloride particles, the steps are 1) spraying a molten soluble nitrogen-containing material onto calcium chloride granules sufficiently cool to solidify the molten material into a moisture-inhibiting coating on the granules; and 2) recovering the coated granules. In a preferred method the coated particles have a particle size distribution substantially between 0.4 and 5 mm. The calcium chloride particles can have a water content of less than 50 weight percent. Preferably, from 5 to 35 parts by weight of the nitrogen-containing compound is sprayed on 100 parts by weight calcium chloride including any water of hydration. Preferably, there is a further step of applying an outer coating of from 1 to 15 weight percent petrolatum. More preferably, there is a still further step of admixing the coated particles with a finely-divided conditioning agent.

Preferably, the calcium chloride particle or the nitrogen-containing material can contain another plant nutrient. In a preferred embodiment of this method, the nitrogen-containing material is urea. In another aspect of this method there is a further step of spraying formaldehyde on the urea-coated particles to form an outer layer of urea-formaldehyde resin. Preferably, the molten urea is sprayed at a temperature of about 280° F., and the recovered coated particles have a temperature less than 120° F. The free-flowing calcium chloride granules can then be applied to the soil.

DETAILED DESCRIPTION OF THE PREFERRED EMBODIMENTS

The free-flowing moisture resistant calcium-containing particles of this invention inhibit the water absorption characteristics of calcium products, including soluble calcium products that are hygroscopic and deliquescent. According to the teachings of this invention, a core of a calcium containing material can have one or more coatings that are moisture resistant or even hydrophobic to inhibit water absorption. The coated particles may then be shipped, stored and handled as a dry, anhydrous product with less risk of problems caused by exposure to humidity.

In the agricultural industry, the core is preferably calcium chloride. If coated as disclosed in this invention with urea or other nitrogen sources, it is useful as both a soil conditioner and a fertilizer. It can be even more useful if other plant nutrients are mixed with either the core or the coating materials of the particles. Additional coatings of hydrophobic materials increase the water resistance of the particles. Mixing with a finely divided conditioning agent such as talc or calcium carbonate can be effected to achieve a more free-flowing particle.

Although the significance of moisture resistant calcium-containing products is important in the agricultural and land use industies, the composition and method of producing the free-flowing moisture resistant calcium-containing particles of this invention can be useful in any industry that requires calcium salts, such as, for example, in the food industry, as a compacting agent in road stabilization, road de-icing, in the treatment of oily wastes and as a desiccant for drying gases and liquids. The core can comprise soluble calcium salts including calcium chloride, calcium nitrate, calcium formate, calcium acetate, a calcium salt of an organic acid, a calcium saccharide compound, or a combination thereof. For the purposes of illustration and simplicity, the invention will be described below with reference to calcium chloride as a preferred example, but it is understood that the present invention is not limited to calcium chloride as the core material.

The calcium chloride core preferably has a water content of less than 50% weight percent. More preferred is a granular, chloride having 75 to 95 weight percent, preferrably, 94 weight percent $CaCl_2$. When the calcium-containing core is calcium nitrate, it preferably has less than 30 weight percent combined moisture. When the calcium-containing core is calcium acetate, it should contain less than 19 weight percent combined moisture.

When used as a soil amendment, soil conditioner or fertilizer, the calcium-containing core can include one or more other plant nutrients. These plant macro- or nutrients are selected from the group consisting of phosphorus, potassium, magnesium, iron, copper, zinc, manganese, molybdenum, sulfur, boron and combinations thereof. These nutrients are present as salts or in other forms in which the nutrient element can be released into the soil or other plant growth media.

When used as a soil conditioner or fertilizer, this composition comprises particles having a calcium chloride core, with or without additional plant nutrients, and an essentially calcium free soluble nitrogen-containing coating which may also contain an additional plant nutrient, wherein the coating inhibits moisture uptake by the core. The nitrogen-containing coating is preferably urea, ammonium nitrate, urea phosphate, melamine, urea aldehyde polymers, monoammonium phosphate, diammonium phosphate, or the like or a combination of the above. The calcium-containing core can also include an ammonia-based material, for example, ammonium sulfate, ammonium nitrate or ammonium chloride, or the like.

Preferably, the free-flowing, urea-coated calcium chloride particles have from 5 to 35 parts by weight urea, per 100 parts by weight calcium chloride including any water of hydration.

The moisture-resistant calcium-containing particles can also have a second coating of a hydrophobic material over the first soluble coating. The hydrophobic coating can be a paraffinic hydrocarbon such as petrolatum or paraffin with a melting point between 100° F. and 260° F. In a more preferred embodiment, the free-flowing particles have an outer coating of from 1 to 15 weight percent petrolatum. Alternatively, the hydrophobic coating can be a polymeric resin material, such as, for example, urea-formaldehyde, polyethylene, polypropylene, polystyrene, or the like. As another alternative, the hydrophobic material is dispersed in the soluble coating.

If desired, the calcium chloride particle can have an intermediate layer between the nitrogen-containing or other soluble coating and the underlying core. The intermediate layer can be formed, for example, as the reaction product of the soluble coating and the calcium chloride, e.g. calcium chloride-urea adduct. Alternatively, the intermediate layer can be the reaction product of calcium chloride with a material such as, for example, sulfate, phosphate, silicate, or the like which forms an insoluble calcium compound. In this manner, moisture uptake is inhibited by the newly formed calcium-containing materials and the remaining unaltered calcium-containing core material can slowly release calcium over a longer period of time. As another alternative, the hydrophobic material mentioned above can also be used as an intermediate layer.

In addition, the coated, moisture-resistant calcium-containing particles can be in an admixture with a finely divided conditioning agent. Suitable conditioning agents are for example, talc, calcium carbonate, calcium hydroxide, calcium oxide, apatite, dolomite, diatomaceous earth, perlite, volcanic glasses, bentonite, montmorillonite, kaolin, vermiculite, attapulgite or the like. The conditioning agents keep the particles from sticking together and promote slip to keep the particles in a free-flowing state.

The resulting moisture-resistant calcium-containing particles preferably have a particle size distribution substantially between 0.4 and 5 mm. For most agricultural applications, a particle size of less than 3 mm is more preferred. However, in various land use applications such as those used in modern forestry, particle size can increase up to 3 inches in diameter. These large-size particles can be used for air drop fertilization and soil conditioning over large land area where the larger sized particles are necessary to get through dense vegetation.

In agriculture, particle size is important in soil conditioners and fertilizers because of standardized spreading equipment and the common practice of blending various dry soil additives so that only one application is required. It is generally accepted that bulk, dry fertilizers and soil additives have a size range between 6 mesh U.S. Standard (3.35 mm)

and 16 mesh U.S.Standard (1.19 mm). The particle size distribution is frequently characterized by a Size Guide Number, SGN, which is defined as the size at which 50% is retained, expressed in millimeters multiplied by 100 and rounded to the nearest 5. Many dry, granular materials have SGN's between 190 and 230. Desirably, the particle size distribution is relatively narrow.

The moisture-resistant calcium-containing products are generally made by applying a coating of the desired coating material. In a preferred method, the dry, granular calcium salt is fed into a coating device such as a drum granulator, drum coater, pan or disk granulator, pan or disk coater, a fluid bed granulator or coater or any other suitable device designed for coating. Preferred apparatus for granulation and coating of materials are described in the following patents to Shirley, Jr. et al.: U.S. Pat. No. 4,213,924, U.S. Pat. No. 4,424,176, and U.S. Pat. No. 4506,453 which are hereby incorporated herein by reference in their entirety as if fully reproduced.

Briefly, a rotary drum coater, is inclined at an angle from about 0 degrees to about 10 degrees from the horizontal. The amount of inclination depends on the desired residence time and other operating parameters. The size of the drum is determined by the desired throughput. The coating agent in liquid form is introduced into the coating device through a system of spray nozzles.

A preferred first coating agent is molten urea (46.6% nitrogen, m.p. 274° F./134° C.), but other materials such as molten ammonium nitrate, urea-water solutions, ammonium nitrite-water solutions, are also considered to be part of this invention. For the purposes of illustration and simplicity, the invention will be described below with reference to molten urea as a preferred example, but it is understood that the present invention is not limited to molten urea as the coating material.

The first coating apparatus should provide sufficient residence time, to allow the calcium salt core granules to be evenly coated, for example, 0.5 to 60 minutes. If desired, the coated calcium core can then be passed to a separate cooling or drying apparatus such as a drum or a fluid bed, preferably a rotary drum. The rotary drum dries or cools the coated core to a temperature below the melting point of the coating, so that the coated particles are no longer sticky. Where molten urea is used as a coating material, particles discharged from the rotary coating drum (or separate cooler if used) have a temperature below the melting point of urea, preferably below 120° F. Other molten coatings require different discharge temperatures. For aqueous or other solvent coating materials, the apparatus can serve as a dryer to remove water or other solvents by having heated air introduced at the discharge point or at the feed point.

A precoating material is optionally applied to the calcium salt core before the application of the urea coating by the previously described method so that an intermediate layer is formed between the calcium salt core and the urea coating. A precoating of a hydrophobic material, polymer or an insoluble sulfate, phosphate or silicate can increase the moisture resistant qualities of the particles.

Preferably, a hydrophobic coating is applied to the urea coated calcium-containing particle by adding the hydrophobic material at the exit end of drum. Alternatively, the coated particles can be passed through another coating apparatus suitable for coating as described above, for example, a drum granulator, drum coater, pan or disk granulator, pan or disk coater, a fluid bed granulator or coater or the like. The hydrophobic coating can be in a molten form or alternatively applied as an aqueous or solvent solution of a polymer or polymer-forming material, such as, for example, a solution of formaldehyde in water with or without methanol stabilization, a solution of amine-formaldehyde, molten sulfur, any of the aliphatic or polyol polymers such as polyethylene, polyethylene glycol, polyvinyl alcohol or the like.

If desired, the hydrophobic coated particle is then passed to a cooling or drying apparatus such as drum cooler/dryer or a fluid bed cooler/dryer, preferably a rotary drum cooler/ dryer. Molten coatings require cooling to a temperature below the melting point so that the discharged solid particles are not sticky. Aqueous or other solvent solutions are dried to remove the water or other solvent and cure any resins formed during the process.

A preferred final step in the method of making the moisture-resistant calcium containing particles is conditioning the coated particle by admixing it with one of the conditioning agents mentioned above using conventional solids blending equipment and procedures.

The additional plant nutrients mentioned above can also be applied either prior to or simultaneously with the precoating or coating materials, e.g. by blending with the molten urea prior to the spraying step. The plant nutrients can additionally or alternatively be incorporated into the calcium core, any precoating material, the hydrophobic coating, and/or the conditioning agents in the desired proportion. Alternatively, the additional nutrient can be applied as a separate coating under or over the urea coating.

The preferred method of making moisture-resistant calcium containing particles includes a step of passing the particles through a screening apparatus where the coated particles are classified into oversized, onsize, or undersized fractions. The inappropriate sized products may be recycled or further treated.

As used in the land use and agricultural industies, the free-flowing, coated particles of this invention can be applied independently as a soil amendment or fertilizer.

The present invention may be further illustrated by the following examples.

EXAMPLES

Example 1

A commercial brand of granular, anhydrous calcium chloride (94% $CaCl_2$) was fed at a rate of 90.5 lbs/hour onto a rotating pan. Molten urea was sprayed from a full cone nozzle, positioned 6 inches above the rotating bed of calcium chloride. The temperature of the molten urea was maintained at 140° C. (284° F.) with a heated urea melting system. The rate of urea application was 24.5 lbs/hour. A red dye was added to the molten urea so that the effectiveness of the coating of the calcium chloride could be visually observed. Visual inspection indicated that approximately 80–85% of the calcium chloride fed to the pan granulator was well coated. The total rate of production of urea-coated calcium chloride was 115 lbs/hour. The hot coated product from the pan was transferred into containers by a conveyor and cooled. The product contained 26.7 weight percent calcium (74.0 weight percent calcium chloride), 9.9 weight percent nitrogen (21.4 weight percent urea) and 4.6 weight percent water.

Example 2

A commercial brand of granular, anhydrous calcium chloride (94% $CaCl_2$) was fed at a rate of 270 lbs/hour onto a rotating pan. Molten urea was sprayed from nozzles, positioned above the rotating bed of calcium chloride. The temperature of the molten urea was maintained at 140° C. (284° F.) with a heated urea melting system. A green dye was added to the urea so that the extent of urea coverage of the calcium chloride could be monitored. The rate of urea application was 23.4 lbs/hour and the rate of production of the urea-coated calcium chloride was 293.4 lbs/hour. The hot coated product from the pan granulator was transferred into containers by a conveyor and cooled. It appeared that approximately 90% of the calcium chloride fed to the pan granulator was well coated. This first product contained 31.2 weight percent calcium (86.5 weight percent calcium chloride), 3.73 weight percent nitrogen (8.0 weight percent urea) and 5.50 weight percent water.

To simulate a second stage of coating, this first product was reintroduced to the rotating pan at a feed rate of 270 lbs/hour, and sprayed a second time with molten urea. The urea rate in this second application was 30 lbs/hour. This second product was conveyed to storage bins and cooled. This twice-coated product contained 28.2 weight percent calcium (78.0 weight percent calcium chloride), 7.9 weight percent nitrogen (17.0 weight percent urea) and 5.0 weight percent water.

The rates of moisture uptake by the first product containing 8.0 weight percent urea, by the second product containing 17.0 weight percent urea and by untreated calcium chloride were measured at 24° C. and 45% relative humidity. The data in Table 1 below show that the rate of moisture uptake decreases as the weight percent of urea in the coating increases.

humidity. The data in Table 2 below show that the addition of formaldehyde to the product decreased the rate of moisture uptake to a small extent.

TABLE 2

| CaCl$_2$ Coated with 15% Urea | | CaCl$_2$ Coated with 15% Urea and 1% Formaledhyde | |
|---|---|---|---|
| Time (Minutes) | Grams Moisture/ Gram Sample | Time (Minutes) | Grams Moisture/ Gram Sample |
| 0.0 | 0.000 | 0.0 | 0.000 |
| 12.5 | 0.017 | 12.2 | 0.012 |
| 23.4 | 0.030 | 23.4 | 0.023 |
| 37.3 | 0.047 | 41.5 | 0.042 |
| 59.5 | 0.069 | 59.6 | 0.055 |
| 80.8 | 0.092 | 71.8 | 0.075 |
| 113.9 | 0.124 | 90.2 | 0.083 |
| | | 101.5 | 0.091 |
| | | 120.3 | 0.102 |

R.H. = 47%
Temp. = 20° C.

Example 4

A commercial brand of granular, anhydrous calcium chloride (94 weight percent CaCl$_2$) was introduced into a rotating coating drum at a rate of 317 lbs/hour. Molten urea containing a red dye was sprayed on the falling particles. The rate of urea addition was 79.6 lbs/hour. The product leaving the drum was conveyed to bins and cooled. The product contained 27 weight percent calcium (75.2 weight percent calcium chloride), 9.3 weight percent nitrogen (20 weight percent urea) and 4.8 weight percent water. Visual

TABLE 1

| Uncoated CaCl$_2$ | | CaCl$_2$ Coated with 8% Urea | | CaCl$_2$ Coated with 17% Urea | |
|---|---|---|---|---|---|
| Time (Minutes) | Grams Moisture/ Gram Sample | Time (Minutes) | Grams Moisture/ Gram Sample | Time (Minutes) | Grams Moisture/ Gram Sample |
| 0.0 | 0.000 | 0.0 | 0.000 | 0.0 | 0.000 |
| 27.0 | 0.052 | 17.1 | 0.034 | 18.7 | 0.022 |
| 28.0 | 0.058 | 58.1 | 0.090 | 59.7 | 0.065 |
| 39.0 | 0.091 | 78.1 | 0.114 | 79.9 | 0.086 |
| 54.0 | 0.119 | 110.1 | 0.1 | 111.0 | 0.125 |
| 67.0 | 0.103 | 138.1 | 0.182 | 139.2 | 0.176 |
| 68.0 | 0.114 | | | | |
| 96.0 | 0.169 | | | | |
| 97.0 | 0.172 | | | | |
| 114.0 | 0.211 | | | | |

R.H. = 45%
Temp. = 24° C.

Example 3

A commercial brand of granular, anhydrous calcium chloride (94% CaCl$_2$) was fed at a rate of 270 lbs/hour onto a rotating pan. Molten urea was sprayed from nozzles, positioned above the rotating bed of calcium chloride. The temperature of the molten urea was maintained at 140° C. (284° F.) with a heated urea melting system. The rate of urea application was 47.6 lbs/hour and the rate of production of the urea-coated calcium chloride was 317.6 lbs/hour.

The experiment was repeated a second time. The only difference was that 1.0% formaldehyde in the form of a commercially available urea-formaldehyde resin was added to the molten urea. In both experiments the urea content of the product was approximately 15%.

The rates of moisture uptake by the products from the two experiments were measured at 20° C. and 47% relative observation indicated that 90–95% of the product granules were well coated. The rate of moisture uptake was measured at a relative humidity of 43% and a temperature of 23° C. Table 3 compares the observed moisture uptake rate to that of untreated calcium chloride. Clearly the rate of moisture uptake has been significantly decreased by the 20 weight percent coating of urea.

TABLE 3

| Uncoated CaCl$_2$ | | CaCl$_2$ Coated with 20% Urea | |
|---|---|---|---|
| Time (Minutes) | Grams Moisture/ Gram Sample | Time (Minutes) | Grams Moisture/ Gram Sample |
| 0.0 | 0.000 | 0.0 | 0.000 |
| 27.5 | 0.055 | 19.3 | 0.008 |

TABLE 3-continued

| Uncoated CaCl$_2$ | | CaCl$_2$ Coated with 20% Urea | |
|---|---|---|---|
| Time (Minutes) | Grams Moisture/ Gram Sample | Time (Minutes) | Grams Moisture/ Gram Sample |
| 39.0 | 0.091 | 38.3 | 0.016 |
| 54.0 | 0.119 | 61.7 | 0.024 |
| 67.5 | 0.109 | 97.7 | 0.038 |
| 96.5 | 0.142 | 161.3 | 0.062 |
| 114.0 | 0.211 | 225.3 | 0.085 |
| 166.5 | 0.212 | 344.2 | 0.119 |
| 188.0 | 0.300 | 439.7 | 0.146 |
| 231.0 | 0.307 | | |
| 269.0 | 0.368 | | |
| 282.0 | 0.380 | | |
| 317.0 | 0.428 | | |
| 353.0 | 0.476 | | |
| 378.0 | 0.511 | | |

R.H. = 43%
Temp. = 23° C.

The particle size distributions of the coated and uncoated calcium chloride were determined by dry screening. The untreated calcium chloride prior to coating had a Size Guide Number (SGN) of 125, and the urea-coated particles had a SGN of 210. At the same time, the proportion of fines passing through the 16 and 20 mesh screens was substantially reduced after coating with urea, indicating that the particle size distribution was much narrower.

Example 5

A commercial brand of granular, anhydrous calcium chloride (94 wt % CaCl$_2$), with a particle size range between 6 mesh U.S. Standard (3.35 mm) and 16 mesh U.S. Standard (1.19 mm) was introduced into a rotating coating drum at a rate of about 480 lbs/hour. Molten urea containing a green dye was sprayed at a rate of about 120 lbs/hour on the falling particles and the bed of particles in the drum. After achieving a steady, consistent operation, samples of the coated calcium chloride, being produced at 600 lbs/hour, were taken for analysis and evaluation. Visual observation indicated that over 95% of the product granules were well coated. Then a flow of melted petrolatum was started and added to the already coated materials at the exit end of the coating drum. On exiting the drum this material was fed to a small conditioning drum, where dry, powdered talc was added at about 24 lbs/hour. After achieving a steady, consistent operation, samples of the free-flowing coated and conditioned material were taken for analysis and evaluation. The samples of coated material which did not have any petrolatum contained 10.1 wt % nitrogen (21.7 wt % urea), 26.5 wt % calcium (73.9 wt % calcium chloride) and 4.4 wt % water. The samples of coated material which had the petrolatum and conditioning agents added contained 9.3 wt % nitrogen (19.0 wt % urea) and 25.2 wt % calcium (70.5 wt % calcium chloride). Moisture uptake measurements were made on both samples. The results are shown in Table 4. The addition of the petrolatum reduced the rate of moisture uptake significantly compared to that of urea alone.

TABLE 4

| Coated with 20% Urea | | CaCl$_2$ Coated with 20% Urea 2% Petrolatum, 3.5% Talc | |
|---|---|---|---|
| Time (Minutes) | Grams Moisture/ Gram Sample | Time (Minutes) | Grams Moisture/ Gram Sample |
| 0.0 | 0.000 | 0.0 | 0.000 |
| 13.0 | 0.008 | 10.0 | 0.001 |
| 39.0 | 0.022 | 11.0 | 0.001 |
| 60.0 | 0.032 | 24.0 | 0.001 |
| 102.0 | 0.055 | 31.0 | 0.001 |
| 193.0 | 0.104 | 43.0 | 0.002 |
| | | 60.0 | 0.003 |
| | | 63.0 | 0.003 |
| | | 87.0 | 0.004 |
| | | 121.0 | 0.006 |
| | | 144.0 | 0.009 |
| | | 212.0 | 0.012 |
| | | 266.0 | 0.013 |
| | | 462.0 | 0.023 |

R.H. = 52.6%
Temp. = 24.3° C.

The foregoing description is illustrative and explanatory of preferred embodiments of the invention, and variations in the size, shape, materials and other details will become apparent to those skilled in the art. It is intended that all such variations and modifications which fall within the scope or spirit of the appended claims be embraced thereby.

I claim:

1. Free-flowing moisture resistant calcium-containing particles comprising: a core comprising a hygroscopic calcium-containing material and an essentially calcium free soluble coating on an outer surface of the core to inhibit moisture uptake by the core.

2. The moisture resistant calcium-containing particles of claim 1 wherein the core includes an ammonia based material.

3. The moisture resistant calcium-containing particles of claim 1 further comprising a hydrophobic coating over the soluble coating.

4. The moisture resistant calcium-containing particles of claim 3 in an admixture with a finely divided conditioning agent.

5. The moisture resistant calcium-containing particles of claim 3 wherein the hydrophobic material comprises paraffinic hydrocarbon.

6. The moisture resistant calcium-containing particles of claim 5 wherein the paraffinic hydrocarbon comprises petrolatum having a melting point between 100° F. and 260° F.

7. Free-flowing moisture resistant calcium-containing particles comprising: a core comprising a hygroscopic calcium-containing material and an essentially calcium free soluble coating wherein the soluble coating further comprises a hydrophobic material to inhibit moisture uptake by the core.

8. The moisture resistant calcium-containing particles of claim 6 wherein the hydrophobic material comprises paraffinic hydrocarbon.

9. The moisture resistant calcium-containing particles of claim 7 wherein the paraffinin hydrocarbon comprises petrolatum having a melting point between 100° F. and 260° F.

10. The moisture resistant calcium-containing particles of claim 7 in an admixture with a finely divided conditioning agent.

11. Free-flowing moisture resistant calcium-containing particles comprising: a core comprising a hygroscopic calcium-containing material, a soluble coating, and a hydrophobic layer between the core and the soluble coating.

12. Free-flowing moisture resistant calcium-containing particles comprising: a core comprising a hygroscopic calcium-containing material, a soluble coating, and an insoluble layer between the core and the soluble coating.

13. The moisture resistant calcium-containing particles of claim 12 wherein the insoluble layer comprises sulfates, phosphates, carbonates, silicates or a combination thereof.

14. Moisture resistant calcium-containing particles comprising: a hygroscopic, calcium-containing core and an essentially calcium free soluble coating on an outer surface of the core to inhibit moisture uptake by the core, the core comprising calcium chloride, calcium nitrate, calcium formate, calcium acetate, a calcium salt of an organic acid, a calcium saccharide compound or a combination thereof.

15. The moisture resistant calcium-containing particles of claim 14 wherein the soluble coating comprises a nitrogen-containing material.

16. The moisture resistant calcium-containing particles of claim 14 wherein either the soluble coating or the calcium-containing core includes one or more plant nutrients.

17. The moisture resistant calcium-containing particles of claim 16 wherein the plant nutrients are selected from the group consisting of phosphorus, potassium, iron, copper, zinc, manganese, boron, manganese, molybdenum, sulfur, and combinations thereof.

18. A composition useful as a soil amendment comprising: granules having a calcium chloride core and an essentially calcium free, soluble nitrogen-containing coating selected from the group consisting of urea, ammonium nitrate, urea phosphate, melamine urea aldehyde polymers, monoammonium phosphate, diammonium phosphate and combinations thereof; wherein the coating inhibits moisture uptake by the core.

19. Free-flowing, urea-coated calcium chloride particles comprising: from 5 to 35 parts by weight urea and 100 parts by weight calcium chloride including any water of hydration wherein the urea and the calcium chloride form a urea-calcium chloride adduct layer between the core and the coating; and a particle size distribution substantially between 0.4 and 5 mm.

20. The free-flowing particles of claim 19 comprising an outer coating of from 1 to 15 weight percent petrolatum.

21. The free-flowing particles of claim 19 in admixture with a finely-divided conditioning agent.

22. The free-flowing particles of claim 19 including a plant nutrient in a calcium chloride core or in the urea coating.

23. The free-flowing particles of claim 19 wherein the coating includes urea-formaldehyde resin.

24. The free-flowing particles of claim 23 wherein the resin is dispersed in the urea coating.

25. Free-flowing, urea-coated calcium chloride particles comprising from 5 to 35 parts by weight urea, 100 parts by weight calcium chloride including any water of hydration; and an intermediate layer of insoluble material selected from the group consisting of sulfates, phosphates, carbonates and silicates, between the calcium chloride particles and the urea coating.

26. Free-flowing, urea-coated calcium chloride particles comprising: from 5 to 35 parts by weight urea and 100 parts by weight calcium chloride including any water of hydration wherein a resin is coated over the urea coating.

27. Free-flowing, urea-coated calcium chloride particles comprising: a calcium chloride core and a urea coating wherein the urea and the calcium chloride form a urea-calcium chloride adduct layer between the core and the coating.

28. Free-flowing, urea-coated calcium chloride particles comprising: from 5 to 35 parts by weight urea and 100 parts by weight calcium chloride including any water of hydration and a layer of insoluble material selected from the group consisting of sulfates, phosphates, carbonates and silicates, the particles further comprising a particle size distribution substantially between 0.4 and 5 mm.

29. Free-flowing moisture resistant calcium-containing particles comprising: a core comprising a hygroscopic calcium-containing material containing from about 5 to about 25 percent water by weight of the core; an essentially calcium free soluble, nitrogen-containing coating, a hydrophobic coating over the essentially calcium free soluble coating to inhibit moisture uptake by the core; and a finely divided conditioning agent over the hydrophobic coating.

30. Free-flowing moisture resistant calcium chloride particles comprising: a calcium chloride core and a soluble nitrogen-containing coating wherein the soluble nitrogen-containing coating is applied to the core in molten form.

* * * * *